(12) United States Patent
Simitsis et al.

(10) Patent No.: US 11,314,808 B2
(45) Date of Patent: Apr. 26, 2022

(54) HYBRID FLOWS CONTAINING A CONTINOUS FLOW

(71) Applicant: Hewlett Packard Enterprise Development LP, Houston, TX (US)

(72) Inventors: Alkiviadis Simitsis, Santa Clara, CA (US); William K. Wilkinson, San Mateo, CA (US)

(73) Assignee: Micro Focus LLC, Santa Clara, CA (US)

( * ) Notice: Subject to any disclaimer, the term of this patent is extended or adjusted under 35 U.S.C. 154(b) by 1562 days.

(21) Appl. No.: 15/034,241

(22) PCT Filed: Dec. 19, 2013

(86) PCT No.: PCT/US2013/076477
§ 371 (c)(1),
(2) Date: May 4, 2016

(87) PCT Pub. No.: WO2015/094269
PCT Pub. Date: Jun. 25, 2015

(65) Prior Publication Data
US 2016/0283610 A1    Sep. 29, 2016

(51) Int. Cl.
*G06F 16/00* (2019.01)
*G06F 16/901* (2019.01)
*G06F 16/25* (2019.01)
*G06F 8/41* (2018.01)

(52) U.S. Cl.
CPC .......... *G06F 16/9024* (2019.01); *G06F 8/433* (2013.01); *G06F 16/258* (2019.01)

(58) Field of Classification Search
None
See application file for complete search history.

(56) References Cited

U.S. PATENT DOCUMENTS

| | | | |
|---|---|---|---|
| 6,654,907 B2 | 11/2003 | Stanfill et al. | |
| 7,689,582 B2* | 3/2010 | Behnen | G06F 8/10 707/999.102 |
| 7,895,586 B2 | 2/2011 | Ozone | |
| 8,392,402 B2 | 3/2013 | Mihaila et al. | |
| 9,846,598 B2* | 12/2017 | Wilkinson | G06F 9/5038 |
| 10,102,039 B2* | 10/2018 | Jovanovic | G06F 9/5066 |
| 2006/0048113 A1* | 3/2006 | Ozone | G06F 8/433 717/144 |
| 2008/0133209 A1 | 6/2008 | Bar-Or et al. | |
| 2008/0256149 A1 | 10/2008 | Bansal et al. | |
| 2011/0004880 A1* | 1/2011 | Schumacher | G06F 8/34 718/102 |
| 2012/0254858 A1* | 10/2012 | Moyers | H04L 12/1818 717/177 |
| 2013/0096967 A1* | 4/2013 | Simitsis | G06Q 10/04 705/7.11 |

(Continued)

OTHER PUBLICATIONS

Steady and Unsteady Flow Simulations Using the Hybrid Flow Solver AVBP, Thilo Schonfeld (Year: 1999).*

(Continued)

*Primary Examiner* — Jean M Corrielus

(57) ABSTRACT

Processing a hybrid flow containing a continuous flow can include connecting a continuous flow to a finite flow of a hybrid flow using a continuous connector operator, and processing the data flow graph of the hybrid flow.

20 Claims, 5 Drawing Sheets

(56) References Cited

U.S. PATENT DOCUMENTS

| | | | | |
|---|---|---|---|---|
| 2014/0188841 A1* | 7/2014 | Sun | ............... | G06F 16/24553 707/718 |
| 2014/0244570 A1* | 8/2014 | Simitsis | ............ | G06F 17/30563 707/602 |
| 2014/0344817 A1* | 11/2014 | Jovanovic | ............. | G06F 9/5066 718/102 |
| 2016/0154634 A1* | 6/2016 | Simitsis | ............ | G06F 17/30433 717/156 |
| 2016/0154896 A1* | 6/2016 | Simitsis | ............ | G06F 17/30958 707/741 |
| 2016/0203026 A1* | 7/2016 | Simitsis | ................... | G06F 9/38 718/104 |

OTHER PUBLICATIONS

Properties of data flow frameworks, T.J. Marlowe and B.G. Ryder (Year: 1990).*

Data Flow Program Graphs, Alan L. Davis, Robert M. Keller (Year: 1982).*

Engine independence for logical analytic flows, Jovanovic et al., (Year: 2014).*

Computer Science Division; UC Berkeley; "The design of telegraph: Adaptive DataFlow for Streams" 18 pages; printed May 2, 2016 from http://db.cs.berkeley.edu/jmh/tmp/teleover-draft.pdf.

Cugola, G, "Processing Flows of Information: From Data Stream to Complex Event Processing", Nov. 26, 2010.

Lehner, D.I.W, "Cost-based Optimization of Integration Flows", Jun. 25, 1982.

Yang, Y et al, "HybMig: A Hybrid Approach to Dynamic Plan Migration for Continuous Queries", Oct. 7, 2006.

* cited by examiner

HYBRID FLOWS CONTAINING A CONTINOUS FLOW

BACKGROUND

A hybrid flow is an analytic flow that may execute on multiple execution engines and/or storage engines. The hybrid flow may be partitioned into fragments where each flow fragment of the hybrid flow can be executed on a single execution engine and data may flow between flow fragments through files, database tables, data pipelines, etc. The fragments may have execution dependencies and/or there may be data flow between fragments. With existing analytic flow design tools and execution engines, hybrid flows can be realized as a collection of scripts and code (e.g., structured query language and Java code) that implement fragments and where the execution of fragments is orchestrated by a separate control flow. A control flow can be referred to as a "job flow".

DETAILED DESCRIPTION

Figure 1A:
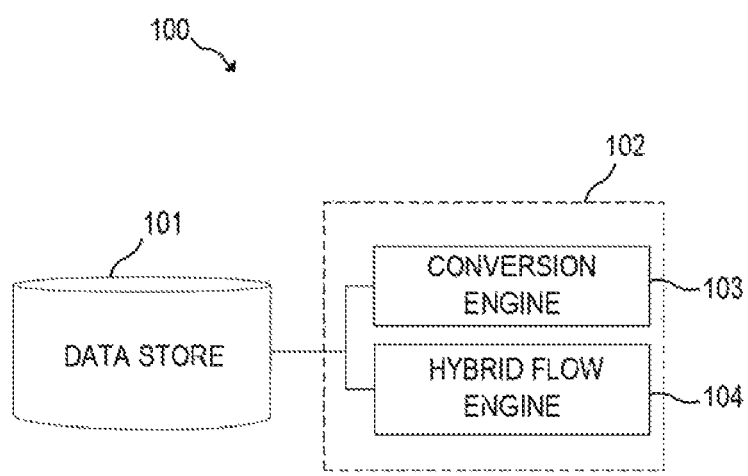
FIGS. 1A-1B illustrate examples of systems according to the present disclosure.

In some instances, a hybrid flow can include a continuous flow. A continuous flow can include a data stream about events that continuous (e.g., does not stop). An event, as used herein, can include an action and/or occurrence. In other words, an event can include something that is happening and the data can include information describing the event. An execution engine that is processing a hybrid flow containing continuous flows can view the data across the continuous flows separately from the finite flows. However, viewing both the continuous flows and finite flows in a single view can allow for greater processing due to the view of the complete hybrid flow.

Integration of continuous flows and/or continuous flow engines with finite flows and/or finite flow engines, in accordance with variety of examples of the present disclosure, can be performed in a way that globally processes the hybrid flow and preserves the flow semantics of the hybrid flow containing the continuous flow. Flow semantics of a hybrid flow can include a function (e.g., output) that is computed, for instance. The hybrid flow containing the continuous flow can be converted to a single data flow graph by mapping a physical continuous flow to and from the data flow graph and modifying the data flow graph using a continuous connector operator (e.g., as discussed further herein). The global processing of the hybrid flow can modify the data flow graph across multiple execution engines including engines executing continuous flows (e.g., continuous flow engines) such that the modified data flow graph can be converted and input into appropriate execution engines.

Further, the global processing can allow dynamic processing of the hybrid flow to enable varying the granularity of details provided and to manage the hybrid flow and/or a particular continuous flow to meet service-level-objectives. Additional examples, advantages, features, modifications and the like are described below with reference to the drawings.

Analytic flow design tools and execution engines can model a hybrid flow at two levels: task flow and job flow. A task flow can contain a series of operators that form a data flow and data stores that contain a collection of data. The task flows, in various examples, can be finite flows or continuous flows. The data flow can move data from a particular set of input data stores and/or data streams to a set of result data stores and/or data streams or display dashboards, and can perform operations on the data. A complex analytic flow (e.g., process) may comprise a number of task flows with data and control dependencies. A job flow can represent a control flow for an entire process. For instance, a job flow can show the flow of information and can contain control capabilities like decision points.

A task flow (e.g., a continuous flow and/or a finite can be represented by a directed acyclic graph (DAG) with a plurality of interconnected operators and data stores and/or continuous data streams, wherein operators, data stores, and/or data streams are represented as nodes in the graph and the data flow between are represented as edges. An operator can include computer-readable instructions that perform a particular function. Such functions can include a type of computation like cleansing, schema modification, data or text analytics, machine learning functions, stream processing operations, event handling, etc. For example, an operator can include computer-readable instructions to "convert dollars to euros" or "calculate the distance between points x and y".

In addition, a job flow can be represented by a DAG with a plurality of interconnected task flows and control points, wherein task flows and/or control points are represented as nodes in the graph and the control flow of the job flow can be represented as edges connecting nodes. A task node can be associated with a particular task flow. Each task node can represent a data flow computation of the task flow that may run on a particular execution engine. The workflow for the analytic process can be specified by control point nodes. A control point node can specify a partial order in which to process task nodes, starting and stopping points for the analytic process, decision points in the workflow, and/or termination conditions, among other things. An analytic flow that involves multiple execution engines can be referred to as a hybrid flow. Without loss of generality, each task node can be assigned to execute on a single execution engine.

In some instances, processing analytic flows can be beneficial to improve efficiency and operation of the analytic flows. Such processing may involve reordering operators, replicating data across data sources, and/or reassigning operators from one execution engine to another, among other processes. Processing can consider the operators and/or data flow of the analytic flow as a whole rather than as separate task flows.

To globally process a hybrid flow (e.g., process across the entire hybrid flow), a hybrid flow can be converted to a data flow graph that contains both control and data flow characteristics of the hybrid flow. This can be done in an automated fashion, such as without human intervention. Converting a hybrid flow to a data flow graph can include combining graphical structures of a job flow with graphical structures of associated task flows (e.g., task flow graphs that include internal operators of task flows represented by task nodes in the job flow). For instance, operators of a task flow can be combined with task nodes in a job flow graph to flatten (e.g., expand) the job flow graph. The flattened job flow graph can then be converted to a data flow graph by converting the control point nodes to data flow nodes using code templates. Terminal nodes (e.g., nodes with either no incoming edge or no outgoing edge) of the data flow graph can represent datasets (e.g., finite datasets or continuous data streams), internal nodes of the data flow graph can represent operations on the datasets, and edges can represent data flow between operations. The converted data flow graph can preserve flow semantics of the hybrid flow.

The data flow graph of the hybrid flow can be processed by a processing engine (e.g., a tool), such as an optimizer. When the data flow graph of the hybrid flow is processed by a processing engine, flow semantics of the hybrid flow can remain intact such that the data flow graph can be converted back into a job flow and a plurality of task flows to be dispatched to appropriate execution engines (e.g., as code) and/or to be sent to an analytic flow design tool that it originally came from. The conversion of the hybrid flow to the data flow graph can involve adding a number of new operators (e.g., a connector, extractor, and loader) that are added to the data flow graph to preserve the flow semantics (e.g., as discussed further herein). In addition, nodes can be revised and new nodes (e.g., operators) can be added during processing of the data flow graph, such that semantics may need to be defined to enable conversion of the data flow graph back into a job flow and plurality of task flows.

In the following detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be used and the process, electrical, and/or structural changes may be made without departing from the scope of the present disclosure.

The figures herein follow a numbering convention in which the first digit or digits correspond to the drawing figure number and the remaining digits identify an element or component in the drawing. Elements shown in the various examples herein can be added, exchanged, and/or eliminated so as to provide a number of additional examples of the present disclosure.

In addition, the proportion and the relative scale of the elements provided in the figures are intended to illustrate the examples of the present disclosure, and should not be taken in a limiting sense. As used herein, "a number of" an element and/or feature can refer to one or more of such elements and/or features.

Figure 1B:
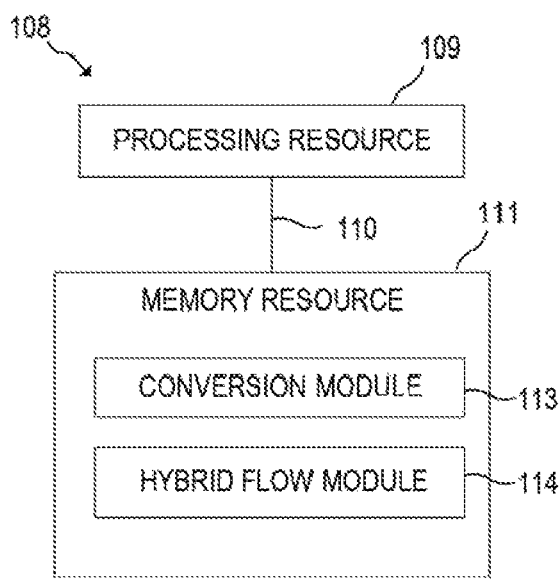

FIGS. 1A-1B illustrate examples of systems 100, 108 according to the present disclosure. FIG. 1A illustrates a diagram of an example of a system 100 for processing a hybrid flow containing a continuous flow according to the present disclosure. The system 100 can include a data store 101, hybrid flow processing system 102, and/or a number of engines 103, 104. The hybrid processing system 102 can be in communication with the data store 101 via a communication link, and can include the number of engines (e.g., conversion engine 103 and hybrid flow engine 104). The hybrid flow processing system 102 can include additional or fewer engines than illustrated to perform the various functions described herein.

The number of engines 103, 104 can include a combination of hardware and programming that is configured to perform a number of functions described herein (e.g., convert a hybrid flow to a data flow graph). The programming can include program instructions (e.g., software, firmware, etc.) stored in a memory resource (e.g., computer readable medium, machine readable medium, etc.) as well as hardwired program (e.g., logic).

The conversion engine 103 can include hardware and/or a combination of hardware and programming to convert a hybrid flow to a data flow graph and connect an output of the continuous flow to an input of the finite flow it the data flow graph using a continuous connector operator. The hybrid flow can, for instance, include a continuous flow and a finite flow.

A continuous flow, as used herein, can include a data stream about events that is continuous (e.g., does not stop). An example continuous flow can include a complex event processing (CEP) flow, for instance. A finite flow can, for instance, include a data set about events that is finite (e.g., stops). Both the continuous flow and the finite flow can, for instance, move data from a particular set of input data stores and/or data streams to a set of result data stores and/or data streams or display dashboards, and can perform operations on the data. However, a continuous flow can perform operations and/or move data that is a continuous data stream (e.g., does not stop).

The continuous flow can be executed using a continuous flow engine and the finite flow can be executed using a finite flow engine (e.g., as discussed further herein). The continuous flow engine and the finite flow engine can include, for instance, execution engines. An execution engine, as used herein, can include hardware and/or a combination of hardware and programming to execute a particular function and/or fragment of job flow (e.g., a task flow).

Converting the hybrid flow can include, for example, converting the hybrid flow to single data flow graph using the conversion engine 103. The data flow graph can be encoded in a logical model (xLM) language, which is an example language for representing logical data flows. As used herein, xLM can include a computer-readable language that is represented in extensible markup language (XML). That is, the data flow graph encoded in xLM language can include a logical data flow model expressed in XML. For instance, a data flow graph encoded in a logical model language can capture structural information for the hybrid flow, dike nodes and edges of the graph. In addition, the data flow graph can contain requirements, resource information, features and properties of the hybrid flow, and/or other flow metadata.

The continuous flow can, for instance, be represented as a flow graph (e.g., a task flow), similarly to a finite flow. However, a continuous flow can have some sources and targets that are annotated (e.g., inputs and outputs) as continuous and some operators may be specific to the continuous flow. For instance, a continuous connector operator can be added to a data flow graph to connect a continuous flow to a finite flow. A continuous connector operator, as used herein, can include an operator to connect an output of a continuous flow to an input of a finite flow in the data flow graph. The finite flow can include a consumer task flow of the continuous flow. As used herein, a consumer task flow can include a task flow with an input schema that matches the output schema of a previous producer task flow. A producer task flow can include a task flow with an output schema that matches the input schema of the predecessor task flow. That is, the output of the continuous flow can be input to the finite flow using the continuous connector operator as an intermediary.

The continuous flow and the finite flow can be represented a nodes in the data flow graph. The continuous connector operator can be represented as continuous connector operator node in the data flow graph. For example, the conversion engine can create the continuous connector operator and/or add the continuous connector operator node to the data flow graph of the hybrid flow.

In various examples, the conversion engine 103 can subscribe the continuous connector operator to the continuous flow in the data flow graph. Alternatively, the system 100 can include a continuous connector operator engine including hardware and/or a combination of hardware and programming to subscribe to the continuous flow and to execute the functionalities of the continuous connector operator. Further, in some examples, the functionalities of the continuous connector operator can be executed by another execution engine, such as the finite flow engine or a continuous flow engine (e.g. as discussed further herein).

The hybrid flow engine 104 can include hardware and/or a combination of hardware and programming to process the data flow graph of the hybrid flow (e.g., a process engine). Processing the data flow graph can include, in some instances, optimizing the data flow graph. That is, the hybrid flow engine 104, in various examples, can be an optimizer. For instance, an optimizer can apply a set of transitions to the data flow graph, such as swap, factorize, partition, function and data ship, decomposition, etc., to create a space of alternative data flow graphs called states (e.g., a plurality of alternative data flow graphs). Each state can come with a cost, so that the optimizer can search the state space for the state among the alternatives that optimizes a particular function.

In a number of examples, the system 100 can include a continuous flow engine, a continuous connector operator engine, and/or a finite flow engine. The continuous flow engine can include hardware and/or a combination of hardware and programming to execute the functionalities associated with the continuous flow. For instance, executing the continuous flow can include executing an operation on continuously collected data. Further, the continuous flow engine can send the data to the continuous connector operator.

The continuous connector operator engine, in some examples, can provide the functionalities associated with the continuous connector operator. For instance, the continuous connector operator engine can include hardware and/or a combination of hardware and programming to aggregate the input data from the continuous flow and send the aggregated data to the finite flow as a data block. In a number of examples, the continuous connector operator engine can replicate a continuous flow to create a new flow (e.g., as discussed further herein). However, examples in accordance with the present disclosure are not so limited. For instance, the functionalities associated with the continuous connector operator can be provided by the finite flow engine and/or the continuous flow engine (e.g., as discussed further herein).

The finite flow engine can include can include hardware and/or a combination of hardware and programming to analyze data from the continuous flow that is aggregated by the continuous connector operator. The analysis can include, for instance, an operation on the aggregated input data. In some examples, the finite flow engine can perform an adaptive function. An adaptive function, as used herein, can include modifying and/or adapting, flow (e.g., the data flow graph) for changing conditions. For instance, the finite flow engine can send output from the analysis on the data from the continuous flow back to the continuous connector operator for further processing (e.g., as discussed further herein).

In various examples, the hybrid flow engine 104 and/or the continuous connector operator engine can add a new flow to the data flow graph of the hybrid flow. The new flow may be added, for instance, in response to analysis of aggregated data from the continuous flow along the finite flow. The continuous connector operator can, for instance, replicate the continuous flow and/or a sub-portion of the continuous flow to be input to the new flow.

Adding a continuous connector operator and/or a new flow, as used herein, can include adding a node representing the continuous connector operator and/or new flow to the data flow graph. For example, a continuous connector operator node can be added to the data flow graph to add a continuous connector operator. Further, a task node representing the new flow and/or a plurality of nodes representing internal operators, data centers, and/or data streams of the new flow can be added to the data flow graph to add a new flow.

In various examples, the hybrid flow engine 104 can switch a position of a node during processing of the data flow graph. The switch can be, for instance, in an alternative data flow graph. The node can include a continuous connector operator node (e.g., added continuous connector operator to connect a continuous flow to a finite flow to convert the hybrid flow to a data flow graph and/or added during processing). The hybrid flow engine 104 can update the node metadata of the node. The update of node metadata can include updating a position identifier of the switched position of the node based on the value of the node metadata attribute assigned to the node.

In some instances, the conversion engine 103 can convert the data flow graph back to a hybrid flow (e.g., job flow and plurality of task flows including the finite flow and the continuous flow). The data flow graph converted back to a hybrid flow, in various instances, can include one of the alternative data flow graphs (e.g., an alternative data flow graph with the lowest cost among the plurality of alternative data flow graphs). The reconverted hybrid flow can be executed on appropriate execution engines.

FIG. 1B illustrates a diagram of an example computing device 108 according to the present disclosure. The computing device 108 can utilize software, hardware, firmware, and/or logic to perform a number of functions described herein.

The computing device 108 can be any combination of hardware and program instructions configured to share information. The hardware, for example can include a processing resource 109 and/or a memory resource 111 (e.g., computer-readable medium (CRM), machine readable medium (MRM), database, etc.). A processing resource 109, as used herein, can include any number of processors capable of executing instructions stored by a memory source 111. Processing resource 109 may be integrated in a single device or distributed across multiple devices. The program instructions (e.g., computer-readable instructions (CRI)) can include instructions stored on the memory resource 111 and executable by the processing resource 109 to implement a desired function (e.g., convert a hybrid flow to a data flow graph).

The memory resource 111 can be in communication with a processing resource 109. A memory resource 111, as used herein, can include any number of memory components capable of storing instructions that can be executed by processing resource 109. Such memory resource 111 can be a non-transitory CRM or MRM. Memory resource 111 may be integrated in a single device or distributed across multiple devices. Further, memory resource 111 may be fully or partially integrated in the same device as processing resource 109 or it may be separate but accessible to that device and processing resource 109. Thus, it is noted that the computing device 108 may be implemented on a participant device, on a server device, on a collection of server devices, and/or a combination of the user device and the server device.

The memory resource 111 can be in communication with the processing resource 109 via a communication link (e.g., a path) 110. The communication link 110 can be local or remote to a machine (e.g., a computing device) associated with the processing resource 109. Examples of a local communication link 110 can include an electronic bus internal to a machine (e.g., a computing device) where the memory resource 111 is one of volatile, non-volatile, fixed, and/or removable storage medium in communication with the processing resource 109 via the electronic bus.

A number of modules 113, 114 can include CRI that when executed by the processing resource 109 can perform a number of functions. The number of modules 113, 114 can be sub-modules of other modules. For example, the conversion module 113 and the hybrid flow module 114 can be sub-modules and/or contained within the same computing device. In another example, the number of modules 113, 114 can comprise individual modules at separate and distinct locations (e.g., CRM, etc.).

Each of the number of modules 113, 114 can include instructions that when executed by the processing resource 109 can function as a corresponding engine as described herein. For example, the conversion module 113 can include instructions that when executed by the processing resource 109 can function as the conversion engine 103. In another example, the hybrid flow module 114 can include instructions that when executed by the processing resource 109 can function as the hybrid flow engine 114.

Figure 2:
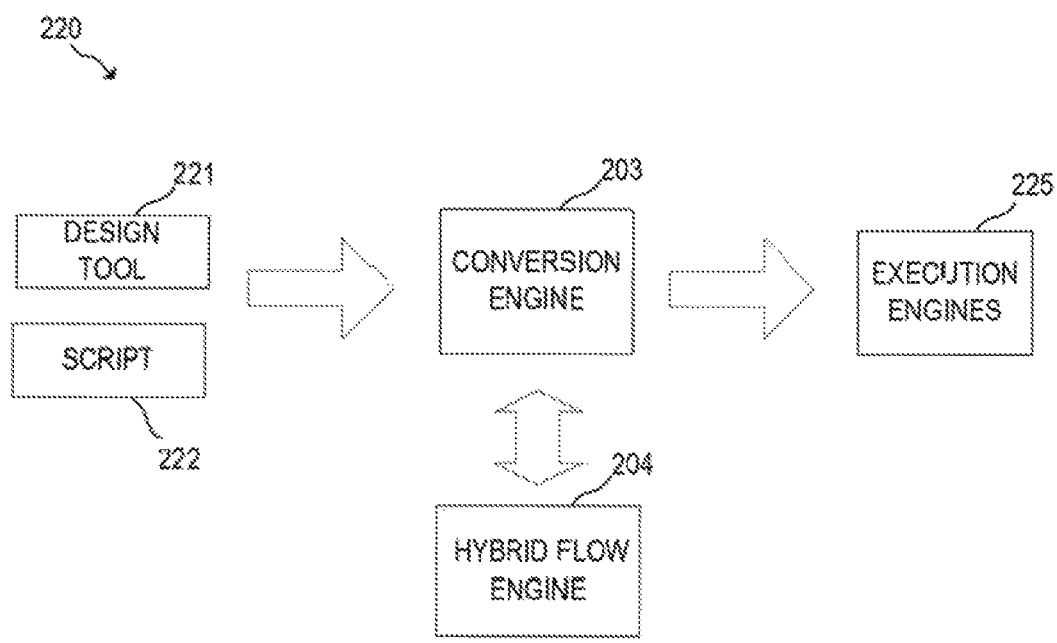
FIG. 2 is a flow diagram of an example of an environment for processing a hybrid flow containing a continuous flow according to the present disclosure.

FIG. 2 is a flow diagram of an example of an environment 220 for processing a hybrid flow containing a continuous flow according to the present disclosure. The environment 220 can be used to convert a hybrid flow to a single data flow graph and globally process the single data flow graph of the hybrid flow.

The hybrid flow, as used herein, can include a job flow and a plurality of task flows. For instance, the plurality of task flows can include a continuous flow and a finite flow. The finite flow can consume the output of the continuous flow (e.g., the output of the continuous flow is an input of the finite flow). In some examples, the finite flow may have a plurality of inputs, including the continuous flow as one of the plurality of inputs. Flows (e.g., finite and continuous flows) can have a plurality of inputs and/or a plurality of outputs in various instances.

The hybrid flow can be represented as a combination of script 222 and/or mixed control flows (e.g., job flows). A hybrid flow with a continuous flow can be input into the environment 220 from analytic flow design tools 221, execution engines and/or other tools. The analytic flow design tools 221 execution engines, and/or other tools can be used to capture the schemata of nodes (e.g., input, output, parameters, etc.), properties (e.g., selectivity, data size for data stores), and other resources (e.g., memory) and features (e.g., the coordinates of the node on the design canvas, if the input hybrid flow with the continuous flow comes from an analytic flow design tool 221).

The input hybrid flow containing a continuous flow can be converted to a data flow graph using a conversion engine 203. The conversion engine 203 can, for example, convert a hybrid flow to the data flow graph and/or convert a data flow graph to a hybrid flow (e.g. output the hybrid flow to execution engines 225).

For instance, the data flow graph can be encoded in an xLM language. A data flow graph encoded in xLM can capture structural information for the hybrid flow, like nodes and edges of the data flow graph, for example. In addition, the data flow graph can contain requirements, resource information, features and properties of the hybrid flow, and/or other metadata.

The data flow graph of the hybrid flow containing a continuous flow can include a plurality of nodes. The nodes can include representations of operators (e.g., internal operators of a task flow represented by a task node in a job flow graph), control point nodes of a job flow graph, and new operators added to convert the input hybrid flow to the data flow graph. The new operators added to convert the input hybrid flow to the data flow graph can include new operators added to decompose an operator with multiple functions (e.g., extractor or loader operators), to connect task nodes of a job flow graph (e.g., connector operators), and/or to connect a continuous flow node (e.g., a task node representing a continuous flow) to a finite flow node (e.g., a task node representing a finite flow).

A connector operator can capture control point logic and information on how to connect task flows. The metadata of the connector operator can encode the type of connection so that a process engine (e.g., the hybrid flow engine) can use the knowledge and can calculate the cost of the connector operator. Further, the metadata of the connector operator can include schemata of the connector operator (e.g., input, output, parameters, etc) that can be used to convert the connector operator back into its original from (e.g., convert the data flow graph to a hybrid flow).

The connector operator added to connect a continuous flow node to a finite flow node can include a continuous connector operator. A continuous connector operator can include an intermediary between an output of the continuous flow and an input of the finite flow. The converse instance (e.g., connecting an output of a finite flow to an input of a continuous flow) may not use a continuous connector operator as the continuous flow can handle such an instance using an interface.

The finite flow may, for instance, expect particular data block sizes and/or frequency. Further, the continuous flow may require specific protocols to subscribe and/or unsubscribe to the continuous flow. The added continuous connector operator can, for instance, subscribe to the continuous flow (e.g., based on the particular protocols), aggregate data from the continuous flow (e.g., to comply with protocols of the finite flow), send aggregated data to the finite flow engine in a single data block, and/or terminate the subscription to the continuous flow based on a termination condition. The termination condition can, for example, include a rule that complies with the protocols of the continuous flow and/or the finite flow (e.g., time thresholds for analyzing data).

The new operators added to the data flow graph can be added to allow a hybrid flow engine 204 to perform a computation or transformation on the data flow graph. For instance, an example hybrid flow engine 204 can include an optimizer. An optimizer can include a p s engine to optimize execution of the hybrid flow for a particular objective and/or function. An optimizer can produce a global optimal solution. For example, an optimizer can apply a set of transitions to the data flow graph to create a space of alternative data flow graphs called states. Each state can come with a cost, so that the optimizer can search the state space for the state among the alternatives that optimizes a particular objective and/or function. Previous process engines (e.g., tools) can optimize a single data flow graph. Further, previous process engines can optimize a data flow graph of finite flows but cannot optimize a hybrid flow containing a continuous flow and a finite flow.

The data flow, graph (e.g., a single data flow graph of a hybrid flow) can be input to the hybrid flow engine 204 by the conversion engine 203. The hybrid flow engine 204 can process and/or test data flows (e.g., the data flow graph). The hybrid flow engine 204 can, for instance, process a single data flow graph at a time. Therefore, a hybrid flow (e.g., a job flow and a plurality of task flows) containing a continuous flow cannot be processed by such a hybrid flow engine 204 because a hybrid flow cam model computation at two levels and comprise a plurality of flows. Converting the input hybrid flow to the data flow graph can enable the hybrid flow engine 204 to, process the hybrid flow (e.g., in the form of the data flow graph).

The hybrid flow engine 204 can include a variety of process engines. For instance, the data flow graph can be input to a process engine that can decompose a single, long task flow into a single job flow of multiple task flows where each task flow executes after the next. In some instances, the data flow graph can be input to a process engine that modifies a job flow that includes task flows that are targeted to execute on a particular engine (e.g., engine x) to a new job flow in which the particular engine (e.g., engine x) is replaced by a different engine (e.g., engine y). In such an instance, the particular engine (e.g., engine x) may be obsolete and/or unavailable. In various instances, the data flow graph can be input to a process engine that composes a number of individual task flows into a single job flow (e.g., because the task flows can have a common sub-computation).

The hybrid flow engine 204 can in accordance with various examples of the present disclosure, maintain flow semantics of the hybrid flow containing a continuous flow during processing of the data flow graph. For instance, flow semantics of the hybrid flow can include attributes of the hybrid flow and/or of a plurality of nodes of the data flow graph. The attributes can include functional attributes and non-functional attributes. Functional attributes can be information that is used by the hybrid flow engine 204 to process the data flow graph of the hybrid flow. For instance, functional attributes can include cost estimates and statistics for the job flow and its task flows. Non-functional attributes, as used herein, can be information that is not used by the hybrid flow engine 204 to process the data flow graph of the hybrid flow containing a continuous flow but that may be used to convert the processed data flow graph into an output hybrid flow by the conversion engine 203.

The processed data flow graph and/or the data flow graph can be converted back to a job flow and/or task flows by the conversion engine 203 resulting an output hybrid flow, in various examples of the present disclosure. That is, the hybrid flow engine 204 can perform a computation and/or process resulting in a revision (e.g., change) to the data flow graph and can send the revised data flow graph back to the conversion engine 203. Converting the revised data flow graph back to a job flow and/or task, flows (e.g., an output hybrid flow) can include reconverting each node (e.g., operator node, control point node and/or new operator node) of the revised data flow graph back into the form that an execution engine expects and/or can process (e.g., as discussed further herein). Fragments of the reconverted hybrid flow can be input into appropriate execution engines 226.

Figure 3:
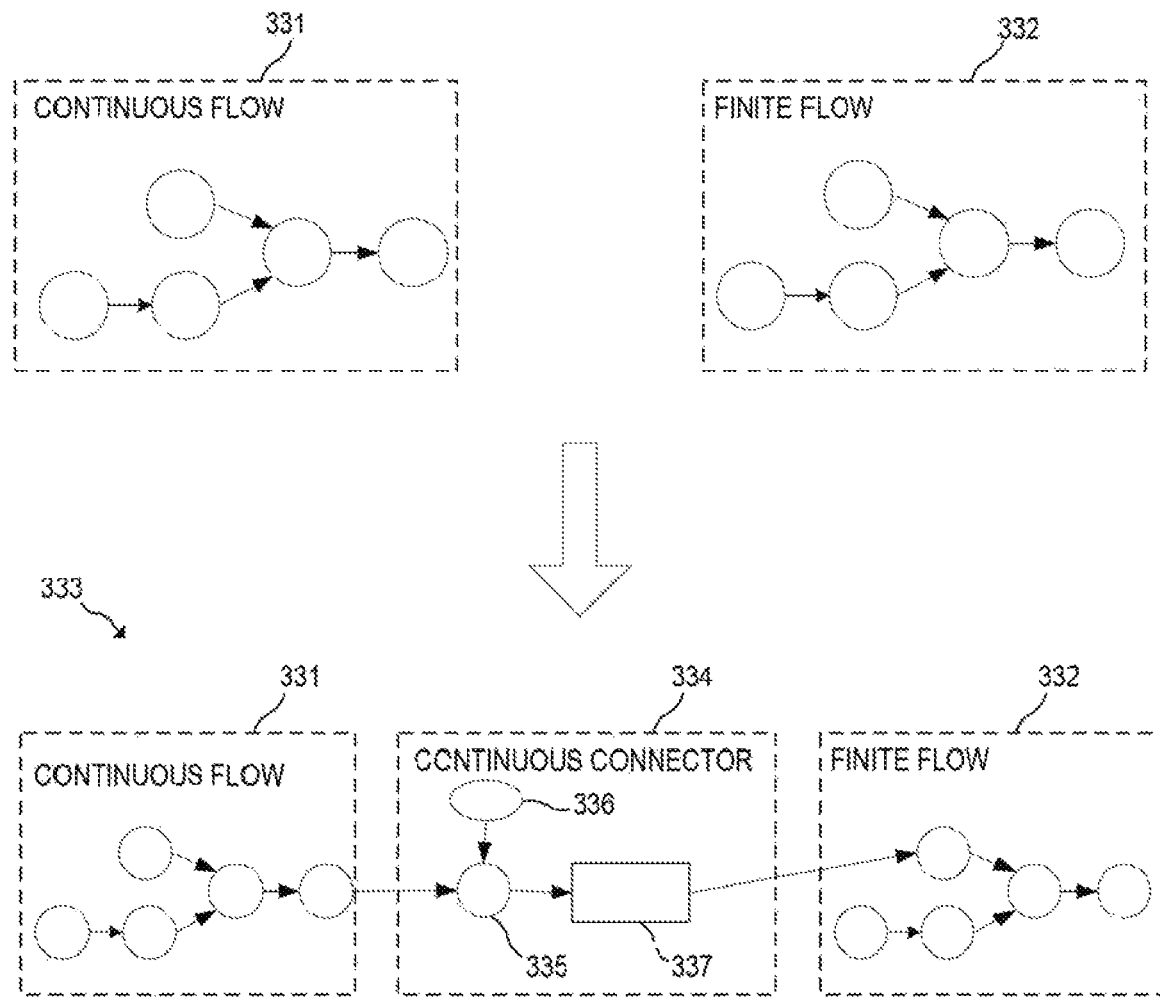
FIG. 3 illustrates an example of converting a hybrid flow containing a continuous flow to a data flow graph according to the present disclosure.

FIG. 3 illustrates an example of converting a hybrid flow containing a continuous flow 331 to a data flow graph 333 according to the present disclosure. As illustrated by FIG. 3, a hybrid flow, in various examples, can include a continuous flow 331 and a finite flow 332.

Although FIG. 3 illustrates a single continuous flow and a single finite flow, examples of the present disclosure are not so limited. Hybrid flows in accordance with the present disclosure, can include a variety of number of finite flows and continuous flows. That is, FIG. 3 can include an illustration of a sub-portion of an entire hybrid flow.

The continuous flow 331 and the finite flow 332 illustrated in FIG. 3 can include task flows represented as a graph (e.g., DAG) with a plurality of interconnected operators that form a data flow and data stores and/or continuous data streams (e.g., represented by the circles in the continuous flow 339 and the finite flow 332) that contain a collection of data. The operators, data stores and/or data streams can be represented as nodes in the graph and the data flow between nodes can be represented as edges.

The continuous flow 331 and the finite flow 332 can be combined with a job flow of the hybrid flow to convert the hybrid flow to a data flow graph 333 of the hybrid flow. The job flow (e.g., not illustrated by FIG. 3) can be represented by a graph (e.g., DAG) with a plurality of interconnected task flows and control points, wherein task flows and/or control points are represented as nodes in the graph and the control flow of the job flow can be represented as edges connecting nodes. A task node can be associated with a particular task flow (e.g., continuous flow 331 or finite flow 332).

Combining the task flows with the job flow of the hybrid flow can include combining graphical structures of the job flow graph with graphical structures of associated task flows (e.g., task flow graphs that include internal operators of task flows represent by task nodes in the job flow). For instance, operators of the continuous flow 331 and the finite flow 332 can be combined with task nodes in a job flow graph to flatten (e.g. expand) the job flow graph. The flattened job flow graph can be converted to a data flow graph 333 by converting the control point nodes to data flow nodes using code templates and/or adding connector operators, such as a continuous connector operator 334. For instance, the data flow graph 333 can contain both control and data control characteristics of the hybrid flow.

In various examples, a continuous connector operator 334 can be added to the data flow graph 333 to connect an output of the continuous flow 331 to an input of the finite flow 332. For instance, the continuous connector operator 334 can be added in response to the finite flow 332 being a consumer of the continuous flow 331 in the hybrid flow. A determination that the finite flow 332 is a consumer of the continuous flow 331 can be made based on annotations of each task flow in the hybrid flow as continuous or finite (e.g., as discussed further herein).

The continuous connector operator 334 can include a specialized connector operator to connect a continuous flow 331 to the finite flow 332 in the data flow graph 333 of the hybrid flow. The continuous connector operator 334 can allow for data flow between the continuous flow 331 and the finite flow 332, and global processing of the hybrid flow over the multiple execution engines.

The continuous flow connector operator 334 can, for instance, subscribe to the continuous flow 331 of the hybrid flow. Subscribing to a continuous flow, as used herein, can include an arrangement and/or authorization to receive data from the continuous flow. The subscription can, for instance, be based on and/or in compliance with specific protocols of the continuous flow 331. For example, the continuous flow 331 can have specific protocols to subscribe and/or unsubscribe to the continuous flow 331. Based on the specific protocols, the continuous connector operator 334 can subscribe to the continuous flow 331.

A subscribed continuous connector operator 334 can collect data from the continuous flow 331. For example, collecting data 335 can include aggregating data from the continuous flow 331 into a single data block of events 337. The aggregation of data into a single data block of events 337 can be based on input protocols of the finite flow 332. For instance, the finite flow 332 may expect input data blocks of a particular size and/or frequency, among other protocols. As illustrated by FIG. 3, the continuous connector operator 334 can send the aggregated data (e.g., the single data block of events 337) to the finite flow 332 for further analysis (e.g., operations).

Further, the continuous connector operator 334 can terminate the subscription to the continuous flow 331 based on a termination condition 336. The termination condition 336 can be, for instance, a specific protocol of the continuous flow 331.

As an example, the continuous flow 331 can have a data stream of social networking posts as inputs and output social networking posts that mention a particular company A. Company A may be test-marketing a new product in a particular geographic region, and may want to analyze social networking posts about the particular product in that particular region for a day. In such an example, the finite flow 332 can be created that consumes the social networking posts that mention company A using the continuous connector operator 334. The finite flow 332 selects social networking posts from the particular region and performs sentiment analysis on those social networking posts. The continuous connector operator 334 can include a termination condition 336 so that the continuous connector operator 334 unsubscribes terminates the subscription) from the continuous flow 331 after one day.

The data flow graph 333 can be processed by a hybrid flow engine. For instance, processing the data flow graph 333 can include optimizing the data flow graph 333. Optimizing the data flow graph 333 can include outputting an alternative data flow graph of the hybrid flow with the lowest relative cost of a set of alternative data flow graphs based on an optimized objective and/or function. The alternative data flow graph can include, for instance, a revised data flow graph (e.g., a revised version of the data flow graph 333).

For instance, using the above provided social networking post example, the data flow graph 333 can be sent to the optimizer. The optimizer can output an alternative data flow graph that pushes the geographic region selection closer to the original social networking post data stream. In other words, a more efficient implementation of the data flow graph 333 can be to use an new continuous connector operator on the social networking post data stream to replicate the posts, send a first stream of the posts to the continuous flow 331, and send a second stream of the posts to a filter (e.g., a new finite flow) that selects for the geographic region and the particular products. In such an instance, the new continuous connector operator can be used to replicate the data stream.

The new continuous connector operator and/or the continuous connector operator 334 can belong to a task flow based on the cost of shipping data. Which task flow the new continuous connector operator and/or the continuous connector operator 334 belongs to, and thereby, get their metadata and properties from can depend on the cost of shipping data (e.g., the network and data transfer cost) from an engine that the continuous flow runs on (e.g., a continuous flow engine) to an engine that the finite flow runs on (e.g., finite flow engine).

In some examples, the hybrid flow engine can add a new flow to output a revised data flow graph. The new flow an include a continuous flow and/or a finite flow. In some instances the continuous connector operator 334 can, for instance, replicate the output from the continuous flow 331, and can send first event data block 337 to the finite flow 332 and a second event data block to the new flow. Alternatively and/or in addition, the hybrid flow engine can add a new continuous connector operator to output the revised data flow graph.

As an example, a continuous data stream can include data from a set of sensors. The continuous flow 331 can aggregate the continuous data stream for each minute and send the aggregated data using the continuous connector operator 334 to a finite flow 332 to analyze the aggregated data for abnormal conditions. In response to the finite flow 332 detecting an abnormal condition and/or determining to analyze the sensor data at a finer level of detail, a new flow and new continuous connector operator can be created and/or added to the data flow graph 333 using the continuous connector operator 334. The finite flow 332 may send feedback (e.g., output data) to the continuous connector operator 334 based on the analysis of the aggregated data (e.g., detecting the abnormal condition). The new flow can, for instance, include a continuous flow to aggregate data for each second. The new flow can be connected to the data flow graph 333 by using a new continuous connector operator to split (e.g. replicate) the continuous data stream from the set of sensors.

Based on the analysis, a specific sensor from the set of sensors may be suspected of malfunctioning. Thereby, the new per-second results can be filtered by the new flow for that specific sensor. The new flow can, for instance, be processed by the hybrid flow engine. For instance, the process can include optimization that may push the new flow closer to the continuous data stream (e.g., upstream of the new continuous connector operator and the per-second aggregation). Thereby, the use of continuous connector operators can allow new flows, finite and continuous, to be attached to existing finite and/or continuous flows. Further, the data flow graph 333 can be globally processed for the best performance.

Figure 4:
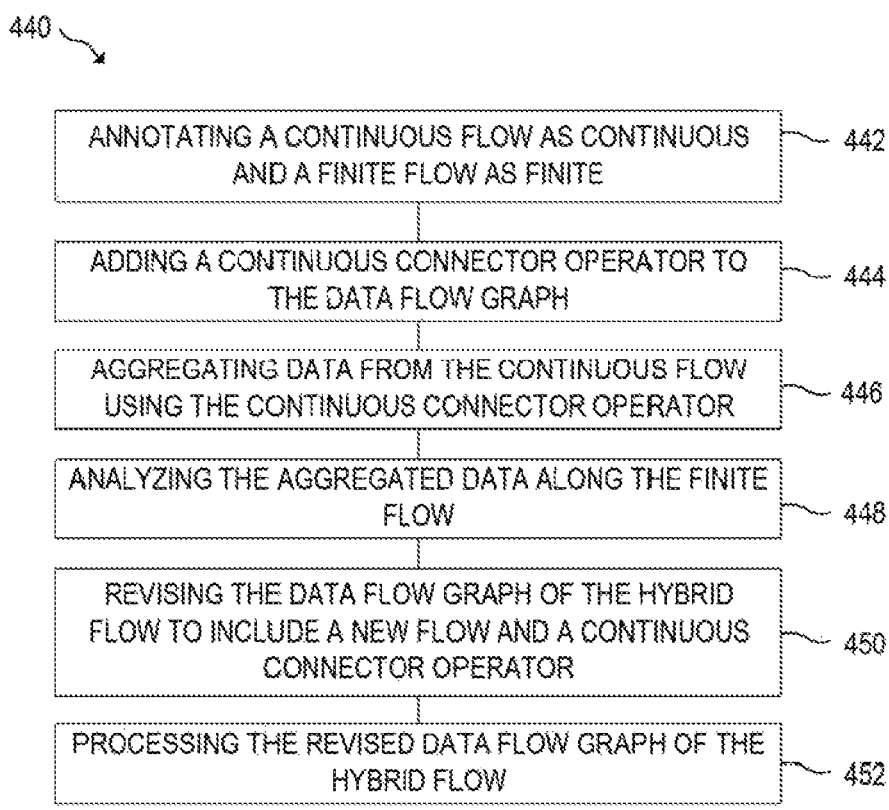
FIG. 4 illustrates a flow chart of an example of a method for processing a hybrid flow containing a continuous flow according to the present disclosure.

FIG. 4 illustrates a flow chart of an example of a method 440 for processing a hybrid flow containing a continuous flow according to the present disclosure. At 442, the method 440 can include annotating a continuous flow as continuous and a finite flow as finite in data flow graph of a hybrid flow. Annotating a flow, as used herein, can include annotating a dataset and/or data stream input into the hybrid flow as continuous and/or finite. The annotation can be used, for instance, to identify a finite flow that consumes an output of a continuous flow.

At 444, the method 440 can include adding a continuous connector operator to the data flow graph to connect an output of the continuous flow to an input of the finite flow in response to identifying the finite flow is a consumer of the continuous flow. Adding the continuous connector operator can, in various examples, include creating the continuous connector operator. The continuous connector operator can be executed, in some examples, by the finite flow engine and/or a different execution engine (e.g., a continuous connector operator engine or the continuous flow engine).

At 446, the method 440 can include aggregating data from the continuous flow using the continuous connector operator. The aggregation can be based on, for instance, specific protocols of the continuous flow and/or the finite flow. At 448, the method 440 can include analyzing the aggregated data along the finite flow (e.g., the internal operators of the finite flow).

At 450, the method 440 can include revising the data flow graph of the hybrid flow to include a new flow and a new continuous connector operator based on the analysis of the aggregated data. For instance, the analysis of the aggregated data may identify analysis of the data at a finer level of detail may be beneficial (e.g., the sensor data stream example). The finite flow can, in various examples, send output (e.g., data) to the continuous connector operator to analyze the data at the finer level of detail (e.g., an adaptive function).

Alternatively and/or in addition, the new flow and/or the new continuous connector operator can be added in response to processing the data flow graph. For instance, the new flow and/or new continuous connector operator can be added in response to processing the data flow graph to create the revised data flow graph. In some instances, the new continuous connector operator may replicate input data (e.g., to the continuous flow and/or to the finite flow).

At 452, the method 440 can include processing the revised data flow graph of the hybrid flow. Processing the revised data flow graph, in some examples, can include outputting an alternative data flow graph of the hybrid flow with the lowest relative cost of a set of alternative data flow graphs based on an optimization objective and/or function. An optimization objective and/or function can include a threshold value (e.g., threshold efficiency, speed of processing, etc.) and/or a balance of values (e.g., accuracy and speed).

Figure 5:
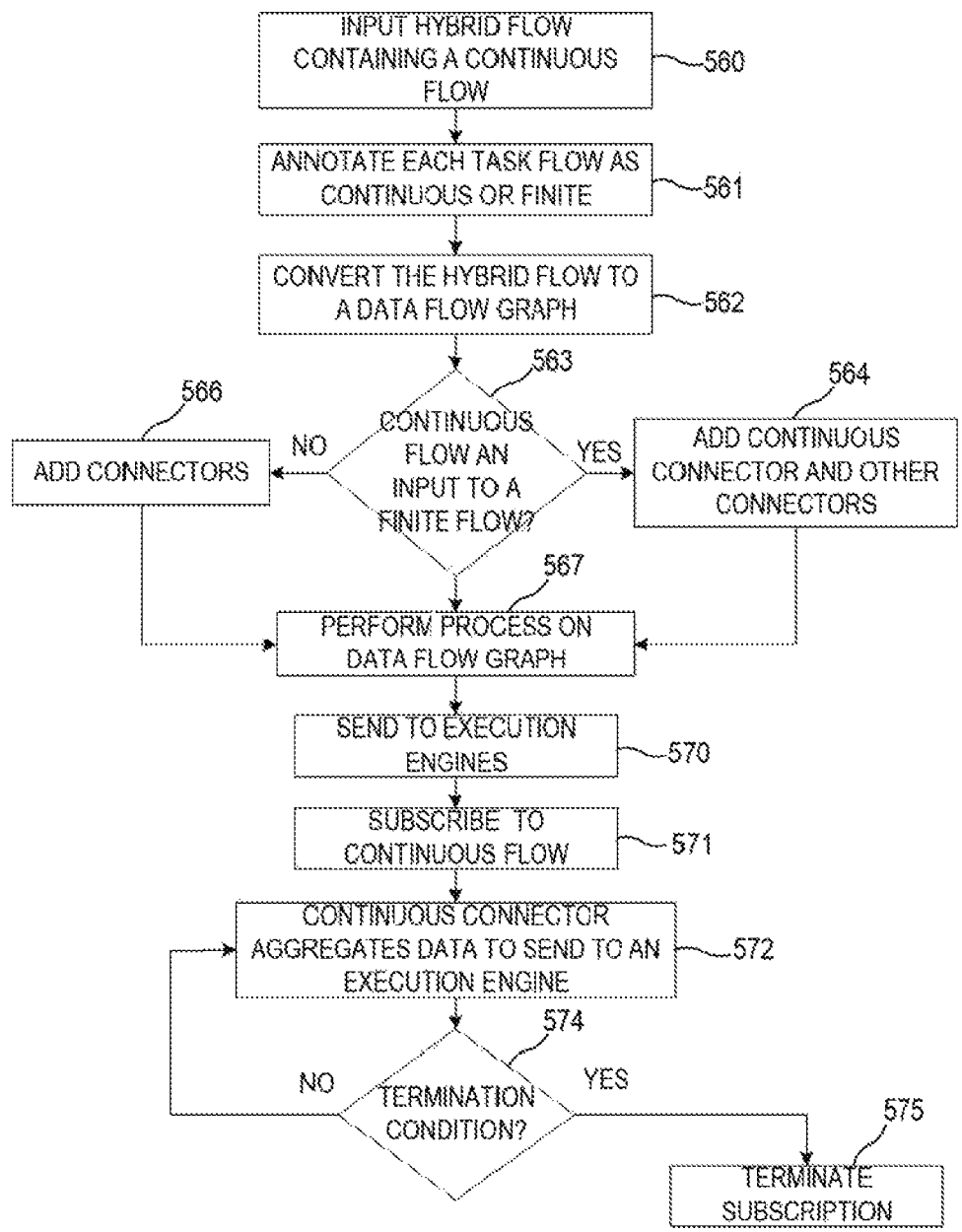
FIG. 5 illustrates an example of a process for processing a hybrid flow according to the present disclosure.

FIG. 5 illustrates an example of a process for processing a hybrid flow according to the present disclosure. At 560, a hybrid flow containing a continuous flow can be input. The hybrid flow can be input from designs tools and/or script to a hybrid flow processing system, for example.

At 561 each task flow of the hybrid flow can be annotated as continuous or finite. A continuous flow can have a continuous data stream as an input. By contrast, a finite flow can have a finite data set as an input.

At 562, the input hybrid flow can be converted to a data flow graph. The data flow graph can, for instance, be encoded in an xLM language.

A determination can be made, at 563, if an output of a continuous flow is an input to a finite flow. In response to determining the data flow graph contains an output of a continuous, flow as an input to a finite flow, at 564, a continuous connector operator can be added to connect the continuous flow to the finite flow. Further, connector operators can be added to connect the task flows in the data flow graph. In response to determining the data flog graph does not contain an output of a continuous flow as an input to a finite flow, at 566, connector operators can be added to connect task flows in the data flow graph.

At 567, a process can be performed on the data flow graph. The process, in various examples, can include optimization of the data flow graph. The process can, in some examples, result in a new flow and/or new continuous connector operator being added to the data flow graph (e.g., a revised data flow graph).

In some examples, although not illustrated by FIG. 5, the revised data flow graph with the new flow and/or new continuous connector operator can be further processed. For instance, processing the revised data flow graph may result in new flows and/or new continuous connector operators.

At 570, the data flow graph and/or revised data flow graph can be converted back into the hybrid flow and sent to execution engines. The execution engines can execute the functionalities associated with the task flows, for example. Further, the continuous connector operator and/or the new continuous connector operator, at 571, can subscribe to a continuous flow. The subscription, in various examples, can be performed by a finite low engine, continuous flow engine, and/or continuous connector engine as part of a flow initiation.

At 572, the continuous connector operator and/or the new continuous connector operator can aggregate data from a continuous flow and send the data to an execution engine executing the finite flow. That is, the finite flow can be a consumer of the continuous flow.

A determination can be made, at 574, whether a termination condition is satisfied. A termination condition may be satisfied, for instance, when the condition has been met. In response to determining the termination condition is satisfied, at 575, the subscription of the continuous connector operator and/or new continuous connector operator to a continuous flow can be terminated. In response to determining the termination conditioned is not satisfied, the continuous connector operator and/or the new continuous connector operator can continue to aggregate and send data (e.g., at 572) until the termination condition is satisfied (e.g., at 574).

The specification examples provide a description of the applications and use of the system and method of the present disclosure. Since many examples can be made without departing from the spirit and scope of the system and method of the present disclosure, this specification sets forth some of the many possible example configurations and implementations.

What is claimed:

1. A system for processing hybrid flows containing a continuous flow, comprising:
   at least one processor; and
   a memory to store instructions that, when executed by the at least one processor, cause the at least one processor to:
   convert a hybrid flow to a data flow graph, wherein the hybrid flow includes a continuous flow and a finite flow; and
   connect an output of the continuous flow to an input of the finite flow in the data flow graph using a continuous connector operator; and
   process the data flow graph of the hybrid flow.

2. The system of claim 1, wherein the instructions, when executed by the at least one processor, further cause the at least one processor to optimize the data flow graph of the hybrid flow.

3. The system of claim 1, wherein the instructions, when executed by the at least one processor, further cause the at least one processor to add the continuous connector operator to the data flow graph of the hybrid flow.

4. The system of claim 1, wherein the instructions, when executed by the at least one processor, further cause the at least one processor to add a new flow to the data flow graph of the hybrid flow.

5. The system of claim 1, wherein the instructions, when executed by the at least one processor, further cause the at least one processor to:

aggregate input data from the continuous flow; and
send the aggregate input data to the finite flow as a data block.

6. The system of claim 5, wherein the instructions, when executed by the at least one processor, further cause the at least one processor to analyze data from the continuous flow that is aggregated.

7. The system of claim 1, wherein the instructions, when executed by the at least one processor, further cause the at least one processor to:
execute an operation on continuously collected data; and
send the continuously collected data to the continuous connector operator.

8. The system of claim 1, wherein:
the continuous connector operator subscribes to the continuous flow to provide data from the output of the continuous flow to the input of the finite flow; and
the instructions, when executed by the at least one processor, further cause the at least one processor to include a termination condition in the continuous connector operator to cause the continuous connector operator to unsubscribe from the continuous flow in response to a predetermined unit of time elapsing.

9. The system of claim 1, wherein the output of the continuous flow provides a flow of data generated by a plurality of sensors.

10. The system of claim 1, wherein the output of the continuous flow provides a data stream of social networking posts.

11. The system of claim 10, wherein:
the continuous connector operator subscribes to the continuous flow to provide the data stream of social networking posts to the input of the finite flow; and
the instructions, when executed by the at least one processor, further cause the at least one processor to include a termination condition in the continuous connector operator to cause the continuous connector operator to unsubscribe from the continuous flow in response to a predetermined unit of time elapsing.

12. A non-transitory computer-readable medium storing instructions executable by a processing resource to cause a computer to:
subscribe a continuous connector operator to a continuous flow of a hybrid flow to connect the continuous flow to a finite flow of the hybrid flow;
aggregate data from the continuous flow using the continuous connector operator;
send the aggregated data to the finite flow of the hybrid flow; and
terminate the subscription of the continuous connector operator to the continuous flow based on a termination condition.

13. The non-transitory computer-readable medium of claim 12, wherein the instructions executable by the processing resource to subscribe to the continuous flow include instructions executable to subscribe in response to identification of an output of the continuous flow as an input to the finite flow.

14. The non-transitory computer-readable medium of claim 12, including instructions executable by the processing resource to:
convert a plurality of task flows of the hybrid flow, including the continuous flow and the finite flow, to a data flow graph that contains control and data flow characteristics of the hybrid flow.

15. The non-transitory computer-readable medium of claim 14, including instructions executable by the processing resource to process the data flow graph including instructions executable to optimize the data flow graph including the continuous connector operator.

16. The non-transitory computer-readable medium of claim 12, wherein the termination condition comprises a predetermined unit of time elapsing.

17. A method for processing a hybrid flow containing a continuous flow, comprising:
annotating, by a computer, a continuous flow as continuous and a finite flow as finite in a data flow graph of a hybrid flow;
adding, by the computer, a continuous connector operator to the data flow graph of the hybrid flow to connect an output of the continuous flow to an input of the finite flow in response to identifying the annotated finite flow is a consumer of the annotated continuous flow;
aggregating, by the computer, data from the continuous flow using the continuous connector operator;
analyzing, by the computer, the aggregated data along the finite flow;
revising, by the computer, the data flow graph of the hybrid flow to include a new flow and a new continuous connector operator based on the analysis of the aggregated data; and
processing, by the computer, the revised data flow graph of the hybrid flow.

18. The method of claim 17, wherein revising the data flow graph to include the new flow and the new continuous connector operator includes creating the new flow in the data flow graph of the hybrid flow.

19. The method of claim 17, wherein revising the data flow graph to include the new flow and the new continuous connector operator includes creating the new continuous connector operator to replicate input data to the continuous flow.

20. The method of claim 17, wherein processing the revised data flow graph of the hybrid flow includes outputting an alternative data flow graph of the hybrid flow with a lowest relative cost of a set of alternative data flow graphs based on an optimization objective.

* * * * *